United States Patent Office 3,533,878
Patented Oct. 13, 1970

3,533,878
SEALING FLUOROCARBON SURFACES WITH
AN ADHESIVE COMPOSITION
Robert F. Aulik, Newark, Norman M. Cassie, Cedar Grove, and Mark M. Taifer, West Orange, N.J., assignors to Armour and Company, Chicago, Ill., a corporation of Delaware
No Drawing. Filed Nov. 24, 1964, Ser. No. 413,638
Int. Cl. B32b 27/08; C09j 5/06
U.S. Cl. 156—320       4 Claims

ABSTRACT OF THE DISCLOSURE

A method of heat sealing fluorocarbon surfaces which have been coated with a solvent solution of an adhesive containing an ethylene-vinyl acetate copolymer, an ester formed by heating a polyol such as pentaerythritol or glycerol with resin, a terpene or dimerized resin acids and a wax.

---

This invention relates to the heat sealing of inert plastic structures such as polyfluorocarbon or polyester film, and the like, and more particularly to a novel adhesive composition for, a novel method of applying said composition to, and a novel heat seal of inert plastic, particularly polyfluorocarbon and polyester sheet, film, web or structure.

The exceptional qualities of polyfluorocarbon and polyester plastics are well known. These plastics make exceptionally good packaging webs. The webs are strong, non-flammable, inert, boilable, selectively vapor permeable, have good slip, good clarity, good flexibility and have Food and Drug acceptance.

The inertness of each plastic has, however, retarded market acceptance as a packaging film because of the difficulty of adhering the plastic to itself or to other materials. Indeed, this is acknowledged in Modern Plastics Encyclopedia, September 1964, McGraw-Hill, Inc., New York, N.Y., page 734, wherein it is stated that polyfluorocarbon plastics may only be bonded to themselves and other materials if pretreated or etched. Although several methods for applying a heat seal coating have been devised, none have been completely satisfactory.

One method has been to extrude a thin film of polyethylene onto the surface of the polyfluorocarbon, or polyester, substrate. For example, if the substrate is film, the film may then be folded upon itself with the polyethylene surface on the inside. Then, when heat and pressure are applied to the edges, the polyethylene, but not the polyfluorocarbon or polyester substrate, melts and a pouch is formed. Such a polyethylene heat seal coat, however, is poorly adherable to the base, sometimes becoming a so-called "leaker" because the heat seal fails to provide a good bond, probably between the polyethylene and the substrate film even though both faces of polyethylene have been melted into one. The heat seal is also not sufficiently impervious to alcohols which frequently comprise a component of the packaged item such as food. Furthermore, the seal is not effective on or around powder or dust. This confines the laminate to the packaging of solids, such as tablets.

In addition to extruded polyethylene as the adhesive, other compositions, known as "hot melts," have also been used. But such usage has not met with complete commercial success because the hot melts are very viscous, and require very high heats during application. Also, their high viscosities force the use of thicker films than desired for economy reasons.

In the Modern Plastics Encyclopedia, the use of epoxy adhesives for fluorocarbons is mentioned, but with the limitation that the "joint strength is only moderate." This is not satisfactory for certain sealing, such as in pouch making, and specifically, boilable pouches where the drastic conditions encountered create havoc with the polyester seal.

An object of this invention is to provide a novel adhesive composition for inert surfaces such as polyfluorocarbon plastics, polyester plastics, and the like.

Another object is to provide an adhesive composition which is useful for package sealing.

Another object is to provide a novel method for the application of said adhesive composition.

Still another object is to provide a novel heat sealed polyfluorocarbon plastic structure.

A further object is to provide an adhesive composition and method which is easily applied.

A still further object is to provide a heat seal for packaging material whereby a boilable package can be made.

Other objects of the invention will in part be obvious and will in part appear hereinafter.

It has now been found that inert web structures such as those of polyfluorocarbon plastics, polyester plastics, and the like, may be adhered to other structures or to themselves by the use of a novel composition, certain components of which are normally used as hot melt, but in this instance, are dissolved in a solvent and applied simply as a solution. Furthermore, it has also been found that the composition is surprisingly effective for adhering shrinkable plastic without loss of adhesion. The novel adhesive composition seems to shrink, at the same rate, as the shrinkable plastic to which it is applied. This allows such shrinkable bags to be heat sealed into open pouches, filled with product, air evacuated, heat sealed at the open end, and lastly shrunk onto the product by application of heat (as by dipping into a hot liquid for a very short time).

Thus, a further object of this invention is to provide a novel adhesive composition for heat shrinkable plastic.

The composition broadly comprises a mixture of a thermoplastic copolymer, an ester of a polyol and wax in a solvent. One specific example of such a mixture is a copolymer of vinyl acetate and ethylene, a rosin ester of pentaerythritol, paraffin wax and toluene.

While the exact mechanism involved in attaining a successful heat-sealable bond with the aforementioned inert substances or with the shrinkable substances is not understood, it is believed that a better wetting by the solvent probably occurs. Such improved wetting of and probable blending of the adhesive into the substrate results in a more positive bond to the inert substrate. This same hypothesis would appear to be equally applicable to shrinkable plastic wherein the improved wetting causes better adhesion of the hot melt composition onto the substrate. Since the composition is dissolved in a solvent, the substrate shrinkable film will not exceed the boiling point of the solvent so long as any solvent remains. Since relatively low boiling solvents are used, the shrinkable film remains cool while the solvent is removed from the adhesive as the shrinkable film, adhesive and its solvent pass through a film treating tower whereas the shrinkable web would immediately shrink into a non-usable state for packages if one attempted to place a melted "hot melt" or "heat seal" directly on one of its surfaces.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

The invention is now described by reference to specific examples which best illustrate the advance made.

EXAMPLE I

A composition consisting of:

20 parts of vinyl acetate-ethylene copolymer such as Elwax 40 marketed by E. I. du Pont de Nemours, a copolymer containing from 39% to 42% by weight of vinyl acetate, 20 parts of a vinyl acetate-ethylene copolymer such as Elwax 220 marketed by E. I. du Pont de Nemours, a copolymer containing 27% to 29% by weight of vinyl acetate, 40 parts of an ester of pentaerythritol and hydrogenated rosin such as Pentalyn A marketed by Hercules Powder Co. of Wilmington, Del., 20 parts of a paraffin wax melting at 133–135° C. such as Essowax marketed by Standard Oil Company of New Jersey, is added to 233 parts of toluene and applied via an applicator roll to one face each of two sheets of polyfluorochloroalkyl plastic film, specifically, Aclar film, as manufactured by Allied Chemical Company of New York, N.Y. The sheets are then placed upon each other with the coated surface abutting each other. A heated platen having a heat of 150° F. and pressure of 20 lbs. per square inch is then pressed upon three of the edges to form an open ended pouch. Then a vegetable item is inserted into the pouch and the fourth edge sealed by application of said platen.

The vegetable containing sealed pouch may be quick frozen for storage for an extended period and still be subsequently immersed in boiling water to heat the vegetable contents without deleterious effect upon the heat seals or the plastic film. The product is extremely tasty because the vapor and flavor ingredients have been locked in.

The adhesive composition of this invention in its broadest aspects comprises:

20 to 100 parts, and preferably 40 parts of a thermoplastic copolymer selected from the group consisting of vinyl acetate and ethylene, vinyl acrylate and ethylene, vinyl acetate and propylene, and of a molecular weight which will form a solution with cold or warm, but not hot, solvent;

5 to 80 parts, and preferably 40 parts of an ester formed by the reaction of a polyol selected from the group consisting of pentaerythritol and glycerol, and an acid selected from the group consisting of rosin (including hydrogenated rosin), terpene, polyterpene, and dimerized resin acids; and 1 to 30 parts, and preferably 20 parts of a wax such as low melting (about 135° F.) paraffin wax, or very low melting (about 120° to 130° F.) microcrystalline wax;

admixed with 100 to 400 parts, and preferably 233 parts of a solvent such as the aliphatic or aromatic hydrocarbons such as heptane, hexane, octane, benzene, toluene, xylol and methyl ethyl ketone.

When the above composition is to be used on substrates which are used to form boilable pouches, it is preferred that the adhesive composition contain a maximum amount of thermoplastic copolymer component, a minimum amount of ester component and a minimum amount of wax, but, in each instance, falling within the concentration ranges above. This will insure a more permanent heat seal under the drastic conditions encountered when the sealed pouch is inserted into boiling water.

The substrate to which the above components may be applied may comprise films, sheets, fabrics, webs or structures of the inert materials comprising polychlorotrifluoroethylene, polytetrafluoroethylene, polyvinylfluoride, polyvinylidenefluoride, polyethylene, polypropylene, polyamide, polyester, copolyester, and the like, or the heat shrinkable materials comprising polyvinylidene chloride, polyvinylchloride, polyethylene, polypropylene, and the more recent heat shrinkable polyesters and polyamides and also aluminum, steel, copper, brass, and other metals.

The heat required to heat seal the above adhesive composition is generally 150° to 275° F. with 180° F. being the more customary heat necessary.

The pressure required to heat seal depends, to a large extent, upon the adhesive composition and the plastic substrate utilized, but, in any event, ranges from 0.5 to 50 p.s.i. with 10 p.s.i. being preferred.

It will thus be seen that the objects set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A method of heat sealing inert plastic surfaces selected from the group consisting of polychlorotrifluoroethylene, polytetrafluoroethylene, polyvinylfluoride, and polyvinylidene-fluoride, to themselves comprising the steps of dissolving in a solvent an adhesive composition consisting essentially of 20 to 80 parts of a thermoplastic copolymer of vinyl acetate and ethylene, containing from 27% to 42% of vinyl acetate by weight, 5 to 80 parts of an ester formed by the reaction of a polyol selected from the group consisting of pentaerythritol and glycerol, and a compound selected from the group consisting of rosin, terpene, polyterpene and dimerized resin acids and 1 to 30 parts of a wax, then applying the resultant solution to the surface of said inert plastic, drying said solution, and subsequently heat sealing the coated plastic to another plastic surface using heat in the range of 150° to 275° F. and pressure ranging from 0.5 to 50 p.s.i.

2. The method of claim 1 wherein said adhesive composition is a copolymer of vinyl acetate and ethylene, an ester of pentaerythritol and hydrogenated rosen acid and a low melting wax, and said solvent is toluene.

3. The method of claim 1 for making boilable plastic pouches comprising the steps of first selecting boilable plastic film of proper dimension for forming the pouch from said inert plastic, then applying said solution to said film, overlapping said film in a manner whereby a pouch is formed and subsequently heat sealing only the edges thereof to form a boilable plastic pouch.

4. The method of making boilable plastic pouches of claim 3 wherein said adhesive composition consists of the composition of claim 2.

References Cited

UNITED STATES PATENTS

| | | | |
|---|---|---|---|
| 2,485,248 | 10/1949 | Watson et al. | |
| 2,490,550 | 12/1949 | Sermattei | 260—27 |
| 2,530,221 | 11/1950 | Bender | 156—583 |
| 2,941,912 | 6/1960 | Cox et al. | |
| 3,017,302 | 1/1962 | Hultkrans | 156—583 |
| 3,025,167 | 3/1962 | Butler | 99—171 |
| 3,215,678 | 11/1965 | Adelman | 260—80.5 |
| 3,232,895 | 2/1966 | Klein et al. | 260—87.3 |
| 3,296,011 | 1/1967 | McBride et al. | |

ROBERT F. BURNETT, Primary Examiner

R. J. ROCHE, Assistant Examiner

U.S. Cl. X.R.

156—332, 334; 161—189, 231, 245, 254; 206—46; 229—48